United States Patent
Raftis et al.

[11] Patent Number: 5,931,197
[45] Date of Patent: Aug. 3, 1999

[54] ASYMMETRICAL CHECK VALVE

[75] Inventors: Spiros G. Raftis; Michael J. Duer, both of Pittsburgh; A. Thomas Abromaitis, Sewickley, all of Pa.

[73] Assignee: Red Valve Co., Inc., Carnegie, Pa.

[21] Appl. No.: 09/061,555

[22] Filed: Apr. 16, 1998

Related U.S. Application Data

[60] Provisional application No. 60/059,520, Sep. 22, 1997, and provisional application No. 60/059,445, Sep. 22, 1997.

[51] Int. Cl.⁶ .................................................. F16K 15/14
[52] U.S. Cl. ........................ 137/847; 137/846; 137/844; 137/843; 251/358
[58] Field of Search ............................... 137/846, 847, 137/844, 843, 849, 850, 848; 251/358

[56] References Cited

U.S. PATENT DOCUMENTS

| | | | |
|---|---|---|---|
| 171,817 | 1/1876 | Khl ........................................ | 137/847 |
| 2,283,835 | 5/1942 | Weaver .................................. | 137/847 |
| 2,926,692 | 3/1960 | Zillman et al. ....................... | 137/849 |
| 3,167,089 | 1/1965 | Gordon .................................. | 137/847 |
| 3,565,106 | 2/1971 | Baumbach ............................. | 137/847 |
| 3,595,266 | 7/1971 | Brookman et al. ................... | 137/847 |
| 3,707,986 | 1/1973 | Breen .................................... | 137/849 |
| 4,492,253 | 1/1985 | Raftis .................................... | 137/849 |
| 4,585,031 | 4/1986 | Raftis et al. .......................... | 137/846 |
| 4,607,663 | 8/1986 | Raftis et al. .......................... | 137/846 |
| 4,993,452 | 2/1991 | Hough .................................... | 137/850 |
| 5,769,125 | 6/1998 | Duer et al. ............................ | 137/844 |
| 5,881,772 | 3/1999 | Bennett ................................. | 137/846 |

*Primary Examiner*—Denise L. Ferensic
*Assistant Examiner*—Joanne Y. Kim
*Attorney, Agent, or Firm*—Webb Ziesenheim Logsdon Orkin & Hanson, P.C.

[57] ABSTRACT

An asymmetrical check valve has an inlet end, a transition part and an outlet end, with a pair of vertical lips facing one another. The lips may be flat or they may be curvilinear. The check valve is asymmetric about a horizontal longitudinal plane through the check valve. The bottoms of the transition part and outlet end may be aligned, with a major portion of the lips extending above the horizontal plane. It is thus possible to install conventional or wide bill check valves in installations with little or no clearance between the outlet end and ground level.

21 Claims, 2 Drawing Sheets

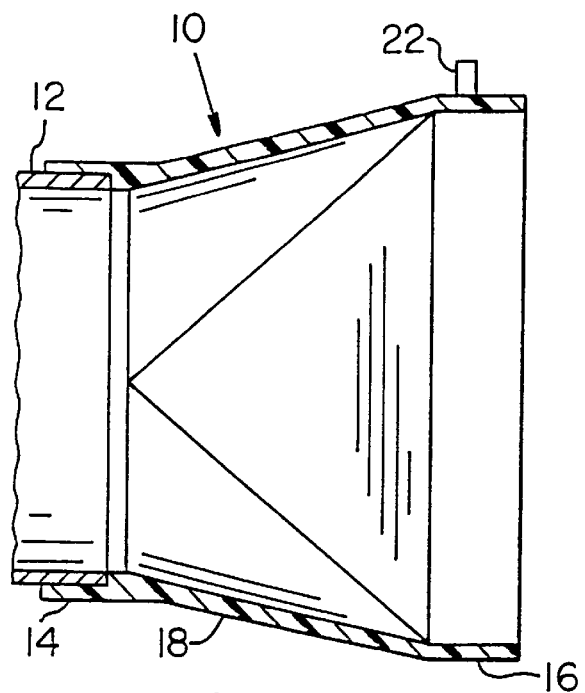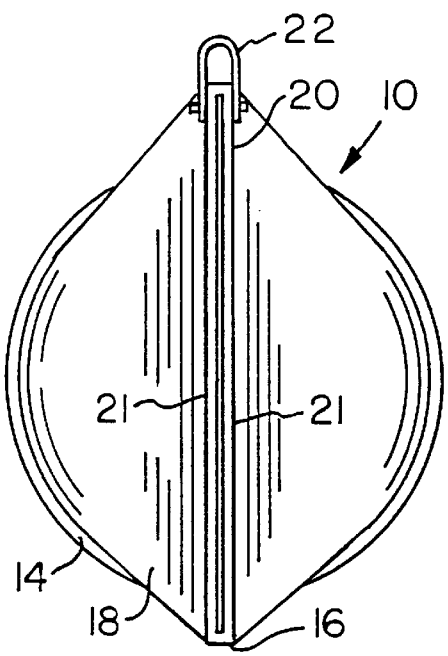
FIG. 1
PRIOR ART
FIG. 2
PRIOR ART
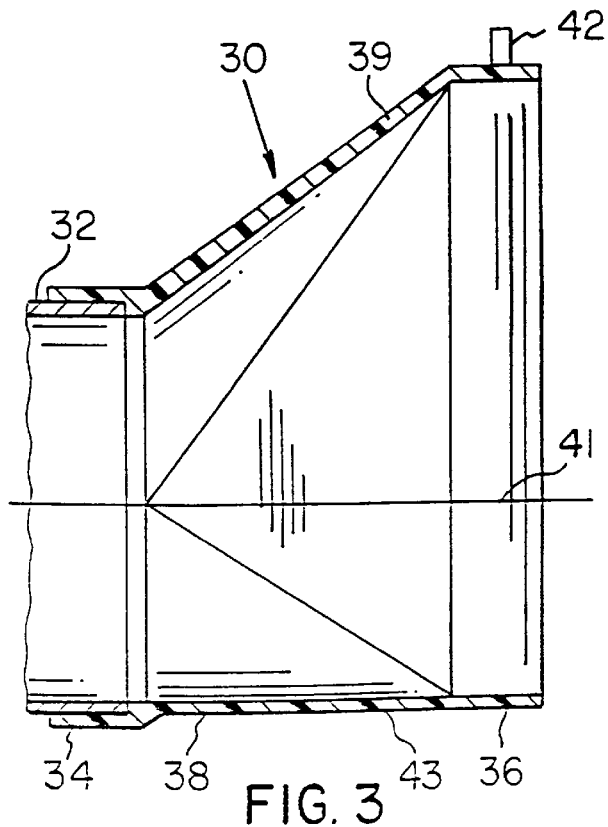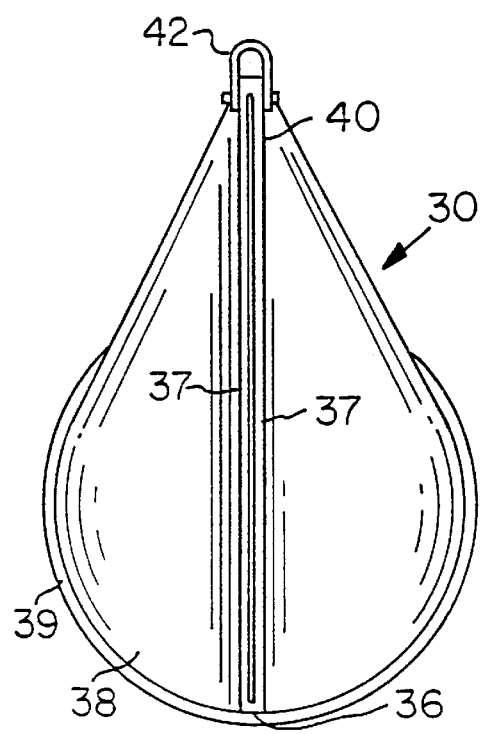
FIG. 3
FIG. 4

ASYMMETRICAL CHECK VALVE

CROSS REFERENCE TO RELATED APPLICATIONS

This patent application claims the benefit of U.S. Provisional Application Ser. No. 60/059,520, filed Sep. 22, 1997 and U.S. Provisional Application Ser. No. 60/059,445, filed Sep. 22, 1997.

BACKGROUND OF THE INVENTION

1. Field of the Invention

The invention relates to a check valve of the so-called "duckbill" type for use in drainage systems and effluent outfall lines.

2. Description of the Prior Art

Conventional rubber check valves are symmetric in two planes and attachable to the end of an outlet pipe. See U.S. Pat. No. 4,607,663. Other check valves have been designed with offset lips. See U.S. Pat. No. 4,585,031. A typical duckbill check valve has an inlet cuff, an outlet bill and a transitional middle part for connecting the cuff and the bill.

To improve the performance of duckbill check valves, valves have been recently developed in which the width of the bill is larger than the diameter of the cuff. See the copending U.S. Provisional Patent Application Ser. No. 60/059,445 entitled "Improved Check Valve With Oversized Bill". The output area in the opened position of the bill thus approaches more of the inlet area of the cuff, and the headloss decreases.

However, conventional rubber check valves, as well as the improved check valve with a wide bill, cannot be placed in every installation because of spatial problems. The valve has to have sufficient clearance between the end of the pipe and ground level for proper operation thereof. If this is not the case, for example, gravel, dirt or sand will accumulate around the lower portion of the bill of the valve, thereby preventing proper opening of the bill.

It is therefore an object of the present invention to provide a check valve having the same or an enlarged output area wherein the mentioned spatial problems of conventional and more recent wide bill check valves are eliminated.

SUMMARY OF THE INVENTION

This object is reached by providing a check valve according to the present invention which has an inlet end, an outlet end and a transition part connecting the inlet end with the outlet end. The check valve according to the present invention has a pair of vertical facing lips and is asymmetric about a horizontal longitudinal plane through the center of the check valve. At least a portion of the top surface on the transition part and/or the outlet end is inclined in an outflow direction through the check valve. It is thus possible to position the check valve in any installation such that there is sufficient clearance below the bill of the valve and above ground level.

The bottoms of at least the transition part and the outlet end may be aligned. The transition part (or the outlet end) may have a horizontal bottom portion and an upwardly inclined top portion. The lips may be offset so that a major portion of the lips extends above the centerline of the inlet end. The height of the lips may be greater than the diameter of the inlet end.

A steel support may be provided in the check valve in order to prevent collapsing of the valve as a result of fluid pressure on the valve (e.g., from back pressure upon submergence of the valve), or sagging of the valve from the weight of the rubber and water in the valve. Additional local reinforcements can be embedded in the valve to further strengthen the valve in various applications.

Further details and advantages of the invention may be seen from the following detailed description, in conjunction with the accompanying drawings, wherein like reference numerals represent like parts.

BRIEF DESCRIPTION OF THE DRAWINGS

FIG. 1 shows a cross-sectional view of a typical duckbill check valve according to the prior art;

FIG. 2 shows a front view of the check valve of FIG. 1;

FIG. 3 shows a first embodiment of the present invention;

FIG. 4 shows a front view of the check valve of FIG. 3;

DETAILED DESCRIPTION OF THE PREFERRED EMBODIMENTS

Figure 5:
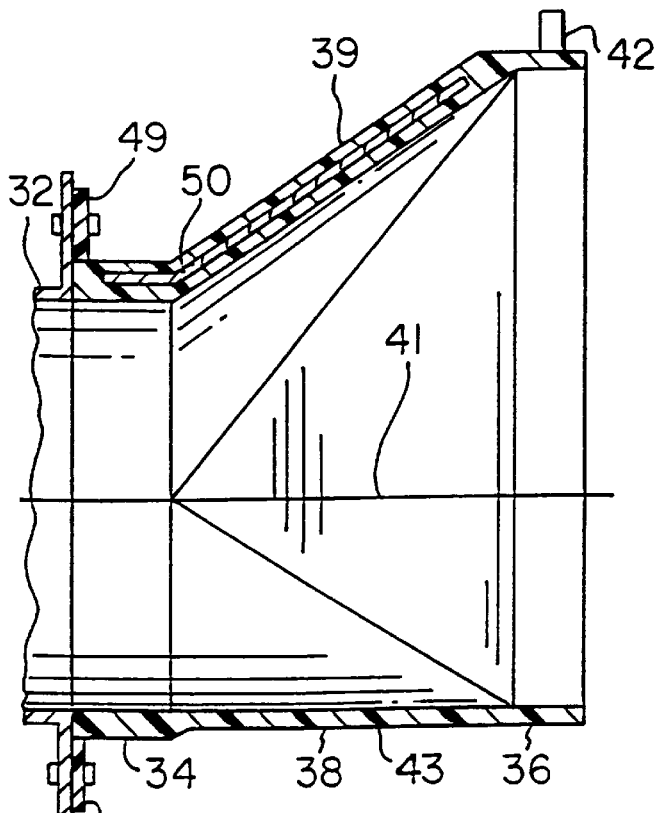
FIG. 5 shows a second embodiment of the present invention.

FIGS. 1 and 2 show a conventional duckbill check valve 10. The check valve 10 is mounted on an outlet pipe 12 of, for example, a drainage system. The check valve 10 comprises an inlet end 14, called a cuff, an outlet end 16, called a bill, and a transition part 18, called a saddle. The cuff may be replaced by a flange.

The outlet end 16 has a slit 20, which opens when fluid is forced through the check valve. Two vertical lips 21, facing one another, define slit 20. A clevis 22 is located at an upper end of outlet end 16.

FIGS. 3 and 4 show a first embodiment of the invention. The asymmetrical duckbill check valve 30 is mounted on an outlet pipe 32. The valve 30 comprises an inlet end 34, outlet end 36 (with vertical facing lips 37) and a transition part 38. All three parts 34, 36, 38 have their respective bottom parts aligned with each other. A top surface 39 on transition part 38 is upwardly inclined in the direction of outflow through the check valve. The cuff 34 is secured to the outlet pipe 32 by known means. The outlet end 36 has a slit 40 and a clevis 42. The check valve 30 is asymmetrical about a horizontal plane coincident with centerline 41, but symmetrical about a corresponding vertical plane. A greater portion of lips 37 is above centerline 41, than is below.

The advantage of this embodiment is that an underside 43 of the check valve 30 is flat, whereby the underside of the valve can be aligned with the underside 45 of the outlet pipe 32. Because of the asymmetrical shape of the valve, it can be used with existing pipe installations where there is insufficient clearance between the end of the pipe and ground level to use a conventional symmetrical bill design.

The height of the bill 36 (i.e., the length of lips 37, measured from corner to corner) can be made greater than existing check valves to lower the pressure drop through the valve without requiring added clearance on the lower side of the pipe. Particularly, the height of the lips 37 may be greater than the diameter of inlet end 34. It has been found that a ratio of the height of lips 37 to the diameter of inlet end 34 equal to 1.57 or more may be most advantageous.

Figure 6:
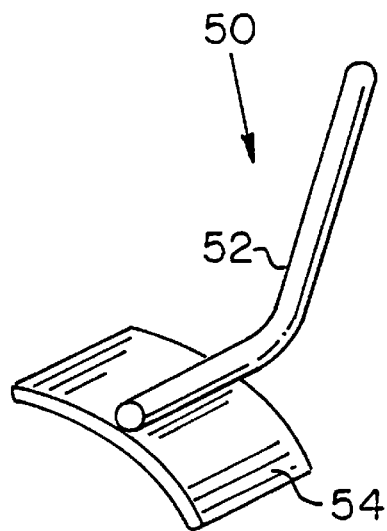
FIG. 6 shows a support bar as used in the check valve of FIG. 5.

FIG. 5 shows a second embodiment according to the present invention in which the same reference numbers are used as in the first embodiment for similar elements. The duckbill check valve comprises furthermore a flange 49 and a support 50 in the top of the inlet end 34 and transition part 38. The support 50 comprises a support plate 54 to which a support rod 52 is welded (see FIG. 6).

This support 50 prevents the check valve from drooping under the weight of the fluid which passes through the valve. Without the support 50, the bill 36 could, under stress, become fixed in the drooped position, thus preventing the valve from returning to a fully closed position.

Figure 7:
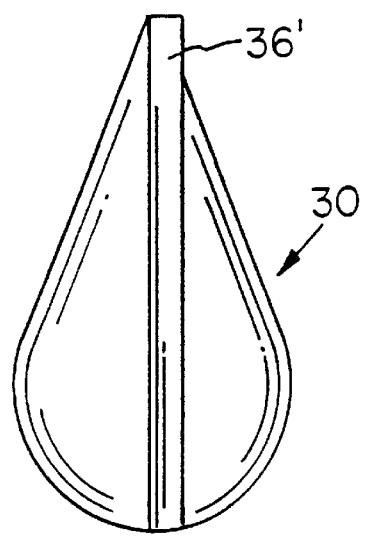
FIG. 7 is a front elevation view of a third embodiment of the present invention.
Figure 8:
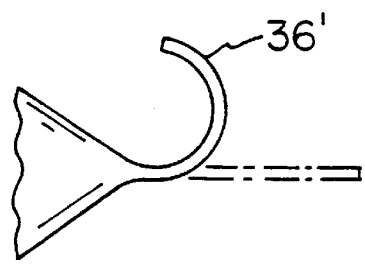
FIG. 8 shows a bill as used in the check valve of FIG. 7.

FIGS. 7 and 8 show a third embodiment of the invention. Bill 36' is curvilinear as shown in U.S. patent application Ser. No. 08/669,755, incorporated herein by reference. As shown in FIG. 8, bill 36' is curvilinear when in the closed position, but unfolds or straightens to a roughly flat configuration when opened by outflow through the check valve 30.

The duckbill check valve is preferably made from an elastomer, such as neoprene, or elastomer reinforced with synthetic fabric, such as nylon or polyester, with construction similar to an automobile tire. The support 50 is preferably made from steel (e.g., spring steel or plain metal) or another suitable resilient material.

The duckbill check valve can be provided with local reinforcements, such as embedded pads of high durometer rubber, high strength synthetic fabric, metal plates, wires, etc.

It will be understood by those of ordinary skill in the art that modifications may be made without departing from the spirit and scope of the present invention. The invention is thus limited only by the appended claims and equivalents thereof.

We claim:

1. A check valve, comprising:

an upstream inlet end and a downstream outlet end;

a transition part located between the inlet end and the outlet end;

said check valve being asymmetrical about a horizontal longitudinal plane through the check valve, said horizontal longitudinal plane coincident with a centerline of the inlet end;

said outlet end comprising a pair of vertical lips facing one another; and at least a portion of a top outer surface on at least one of the transition part and the outlet end being upwardly inclined in an outflow direction through the check valve.

2. The check valve of claim 1 including a flange on the inlet end.

3. The check valve of claim 1 including a reinforcement in the transition part to bias the lips in an offset position.

4. The check valve of claim 3 wherein the reinforcement comprises a support plate embedded in the inlet end with an appending support rod embedded in the transition part.

5. The check valve of claim 1 wherein the transition part and the outlet end are substantially aligned along a bottom of the check valve.

6. The check valve of claim 1 wherein the transition part has a horizontal bottom portion and an inclined top portion.

7. The check valve of claim 1 wherein the lips are offset such that a major portion of the lips extends above the centerline of the inlet end.

8. The check valve of claim 1 wherein the lips form a curvilinear outlet end when in a closed position.

9. The check valve of claim 1 wherein the check valve is symmetrical about a vertical longitudinal plane coincident with the centerline of the inlet end.

10. The check valve of claim 1 wherein the check valve is made at least in part from an elastomeric material.

11. The check valve of claim 10 including synthetic fabric reinforcement in the elastomeric material.

12. The check valve of claim 1 wherein the height of the outlet end is greater than the diameter of the inlet end.

13. The check valve of claim 12 wherein the height of the outlet end is at least 1.57 times the diameter of the inlet end.

14. A check valve, comprising:

an upstream inlet end and a downstream outlet end;

a transition part located between the inlet end and the outlet end;

said transition part and outlet end being substantially aligned along a bottom of the check valve;

said check valve being asymmetrical about a horizontal longitudinal plane through the check valve, said horizontal longitudinal plane coincident with a centerline of the inlet end;

said outlet end comprising a pair of vertical lips facing one another; and at least a portion of a top surface on at least one of the transition part and the outlet end being upwardly inclined in an outflow direction through the check valve.

15. The check valve of claim 14 wherein the transition part has a horizontal bottom portion and an inclined top portion.

16. The check valve of claim 14 wherein the lips are offset such that a major portion of the lips extends above the centerline of the inlet end.

17. The check valve of claim 14 wherein the check valve is symmetrical about a vertical longitudinal plane coincident with the centerline of the inlet end.

18. The check valve of claim 14 wherein the height of the outlet end is greater than the diameter of the inlet end.

19. The check valve of claim 18 wherein the height of the outlet end is at least 1.57 times the diameter of the inlet end.

20. The check valve of claim 14 wherein the lips form a curvilinear outlet end when in a closed position.

21. A check valve, comprising:

an upstream inlet end and a downstream outlet end;

a transition part located between the inlet end and the outlet end, said transition part having a lower horizontal portion and an upper inclined portion, said transition part and outlet end substantially aligned along a bottom of the check valve;

said check valve being asymmetrical about a horizontal longitudinal plane through the check valve and symmetrical about a vertical plane through the check valve;

said outlet end comprising a pair of vertical lips facing one another, said lips offset so that a major portion of the lips extends above a centerline of the inlet end; and the height of the outlet end being greater than the diameter of the inlet end.

* * * * *